United States Patent [19]

O'Boyle et al.

[11] 4,125,743
[45] Nov. 14, 1978

[54] GRAPHICS TRANSMISSION SYSTEM

[75] Inventors: Leonard E. O'Boyle, Oceanport; Gabor P. Torok, Holmdel, both of N.J.

[73] Assignee: Bell Telephone Laboratories, Incorporated, Murray Hill, N.J.

[21] Appl. No.: 804,341

[22] Filed: Jun. 7, 1977

[51] Int. Cl.$^2$ .............................................. G08C 21/00
[52] U.S. Cl. .................................. 178/18; 340/147 LP
[58] Field of Search ....................... 358/258, 282, 295; 178/18, 19; 340/152 R, 152 T, 154, 324 A, 324 AD, 147 LP, 146.3 SY; 346/139 C

[56] References Cited

U.S. PATENT DOCUMENTS

| | | | |
|---|---|---|---|
| 3,300,758 | 1/1967 | Hawley, Jr. ..................... | 340/147 LP |
| 3,500,327 | 3/1970 | Belcher et al. ..................... | 340/154 |
| 3,516,067 | 6/1970 | Cameron ..................... | 178/18 X |
| 3,761,877 | 9/1973 | Fernald ..................... | 178/18 |
| 3,959,585 | 5/1976 | Mattes et al. ..................... | 178/18 |

Primary Examiner—Thomas A. Robinson
Attorney, Agent, or Firm—Sylvia J. Chin; Charles E. Graves

[57] ABSTRACT

This disclosure discloses a graphics transmission system using a chalk writing blackboard, a transceiver and a memory. The blackboard is a pressure-sensitive device under control of circuitry in the transceiver producing indicia of the instantaneous position of the chalk on the writing surface. An eraser tray and eraser at its base provide a means to automatically condition the transceiver to interpret a pressure as erase rather than a write command, simply by the absence of the eraser from the tray. Further signal processing yields a more faithful sampling and reproduction of the written signal. A tape recording adjunct is interconnected through a modulation and phase lock loop network that reduces transmission channel and recorder-introduced signal distortion both in the record and the playback modes.

28 Claims, 16 Drawing Figures

GRAPHICS TRANSMISSION SYSTEM

BACKGROUND OF THE INVENTION

1. Field of the Invention

This invention relates to the transmission of handwriting or graphics intelligence; and to the terminals of stations that transmit and receive and reproduce such data.

2. Description of the Prior Art

In the earlier U.S. Pat. No. 3,706,850 issued Dec. 19, 1972, and assigned to applicants' assignee, there is described a telewriting system for transmitting handwriting and similar data in real time over voice grade telephone lines. In this system the reproduction of the data at a remote location is achieved by a laser that forms graphics information on a film in accordance with incoming scanning signals.

This system and others like it have significant potential use as a medium for remote teaching and teleconferencing. As with all such telewriting systems and equipment, its acceptance depends on ease of use, cost, and the presence of features that faithfully and reliably replicate the graphics information.

For example, systems requiring only a single telephone line make possible the employment of far less expensive data modems which do not require simultaneous duplex transmission. Additionally, it is useful for such a system to communicate simultaneously to several receiving stations and to provide at each such station several — for example three — viewing stations. Considerations of cost suggest that these stations be ordinary television monitors.

Among the telewriting systems features desired but currently unavailable, is provision for distinguishing circuit noise or otherwise bogus signals from genuine graphics. The faithful reproduction of the originating graphics signal such as one written on a remote blackboard of the type described in U.S. Pat. No. 3,959,585 and assigned to applicants' assignee, depends in part on reducing the effects of noise. Good reproduction also depends on graphics signal value sampling in which the X and Y samples are sufficiently close in time to each other to avoid the equivalent of phase distortion which can disconfigure the received writing.

Partial and full erasing features likewise are desired but not reliably available in existing graphics transmission systems. Additionally, the use of tape recorders with electronic blackboard systems in the prior art has not fully addressed the problem of signal distortion due to jitter and other factors.

SUMMARY OF THE INVENTION

In one embodiment, this invention uses three major components: a blackboard input terminal and control unit, a transceiver, and a memory with display at each station. The blackboard input terminal is a pressure-sensitive graphic input device comprising two resistive sheets under the control of circuitry in the transceiver to produce DC voltages that represent the instantaneous position of a chalk on the writing surface. Such a system is described in the earlier mentioned U.S. Pat. No. 3,959,585.

Pursuant to one aspect of the invention, an eraser tray is affixed to the base of the blackboard and contains a conventional chalk eraser. Means are provided to detect when the eraser is on the tray and when it is not, the system automatically conditions itself to convert blackboard contacts as erase commands rather than write commands.

Pursuant to a further aspect of this invention, in order to determine when a blackboard is being written upon, the voltage of one of two resistive sheets, for example, the X sheet, is driven to a predetermined fixed voltage while a substantially lower voltage is maintained on the Y sheet. When the net voltage on the X sheet is measured, the measured value supplies an indication of whether the surface is being written on, i.e., whether the Y sheet has contacted the X sheet to modify the voltage on X sheet. In an extension of this aspect of the invention, the same measurement is used when more than one blackboard input terminal is connected to determine which of them is being written on so that the corresponding remotely located display can be connected.

Pursuant to another aspect of this invention, in order to prevent distorted writing at a display, the X and Y voltages of the sheets, which are not sampled simultaneously in this system, are each sampled at a first rate substantially greater than the transmission rate of 40Hz and stored in a sample and hold circuit from which the sampled voltages are each then resampled at the rate of 40Hz for transmission.

In an analog to digital converter, the analog X and Y samples are converted sequentially into digital form before transmission. At the receiving end, X and Y incoming data is converted into analog form and applied to a dual mode reconstruction filter characterized by a fast and slow mode. The fast mode is used to establish the initial position of the writing that has been initiated. After a suitable delay the filter changes into the slow mode to provide a continuous trace between the received samples. The write command is delayed until the filter is in the slow mode.

The invention and its several other objects, features and advantages will be more readily determined from a reading of the description to follow taken in conjunction with the drawing.

DETAILED DESCRIPTION

Figure 1:
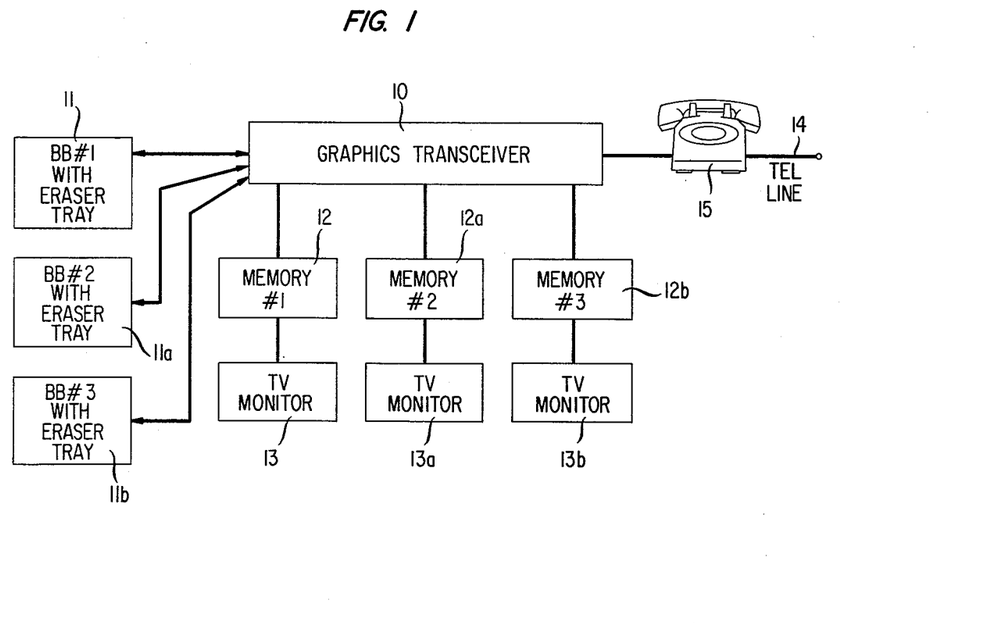
FIG. 1 is a block diagram of one terminal end of a graphics system.

FIG. 1 depicts one terminal end of a graphics system in accordance with the present invention, consisting of a transceiver 10, electronic blackboard 11, memory 12, and TV monitor 13, all connected to a telephone line 14 that includes advantageously a standard telephone set 15. This system can be expanded to include a second and third electronic blackboard 11a, 11b, two additional memory units 12a, 12b, and two additional TV monitors 13a, 13b.

Figure 2:
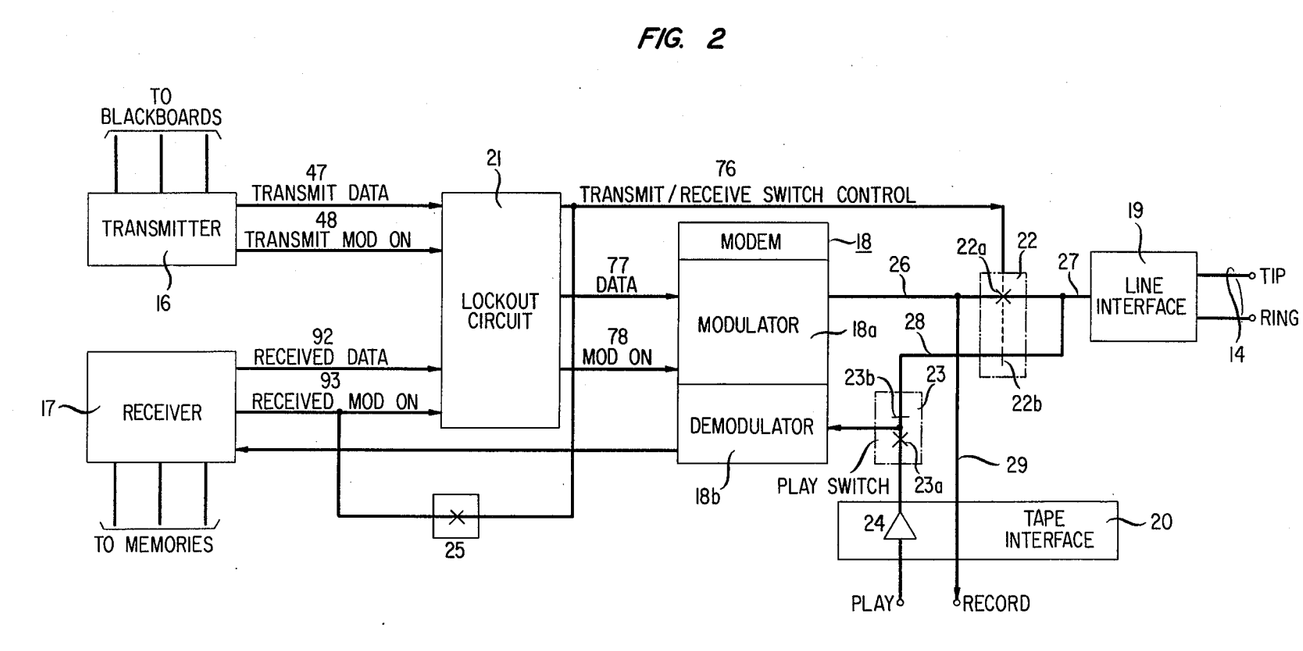
FIG. 2 is a block diagram of the FIG. 1 transceiver.

Transceiver 10 is shown in further detail in the block diagram of FIG. 2. Transceiver 10 includes a transmitter 16 connected to one or more electronic blackboards, a receiver 17 connected to one or more conventional memory units as depicted in FIG. 1, a modem 18, which for example, can be a Bell System 202 type connecting transmitter 16 and receiver 17 to the telephone line 14, and a lockout circuit 21 for normally maintaining the transceiver 10 in a receive mode. A conventional line interface 19 is provided between modem 18 and line 14. A tape recorder/reproducer may also be connected to the system through tap interface 20. Instrumentalities such as test generators, status indicators, power supply, also form a part of the transceiver 10 but are not shown for the sake of simplicity as they form no part of the present invention.

Figure 3:
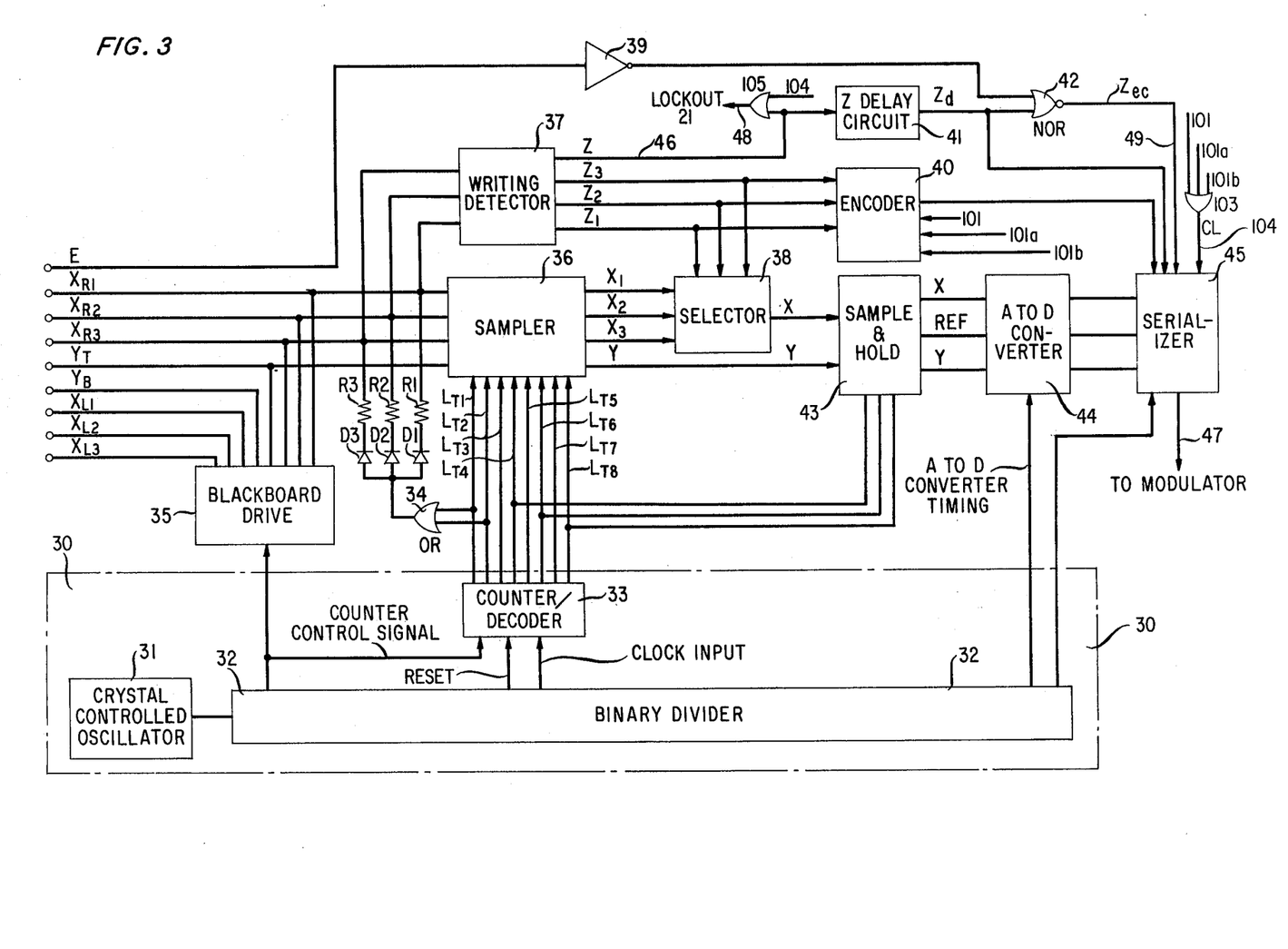
FIG. 3 is a block diagram of the FIG. 2 transmitter.

Transmitter 16, depicted in FIG. 3 in a block diagram, includes a timing source 30, a blackboard drive 35, a sampler 36, a writing detector 37, a selector 38, a Z delay circuit 41, a sample and hold circuit 43, an analog-to-digital converter 44 and a serializer 45.

The timing source 30 for the entire transmitter 16 comprises a conventional crystal controlled oscillator 31, binary divider 32, and a counter/decoder 33. In addition to other output signals, the binary divider 32 generates the clock input, reset and counter control signals schematically shown in FIG. 4. These signals drive counter/decoder 33 which divides a period determined by the reset pulses into eight discrete and equal time slots T1 to T8 and generates pulses representative of the time slots T1 through T8 via output leads LT1 through LT8, respectively, as also schematically shown in FIG. 4. It is with reference to these time slots that the operation of the blackboard drive 35 of transmitter 16 is described.

BLACKBOARD SIGNAL SAMPLING

Figure 5:
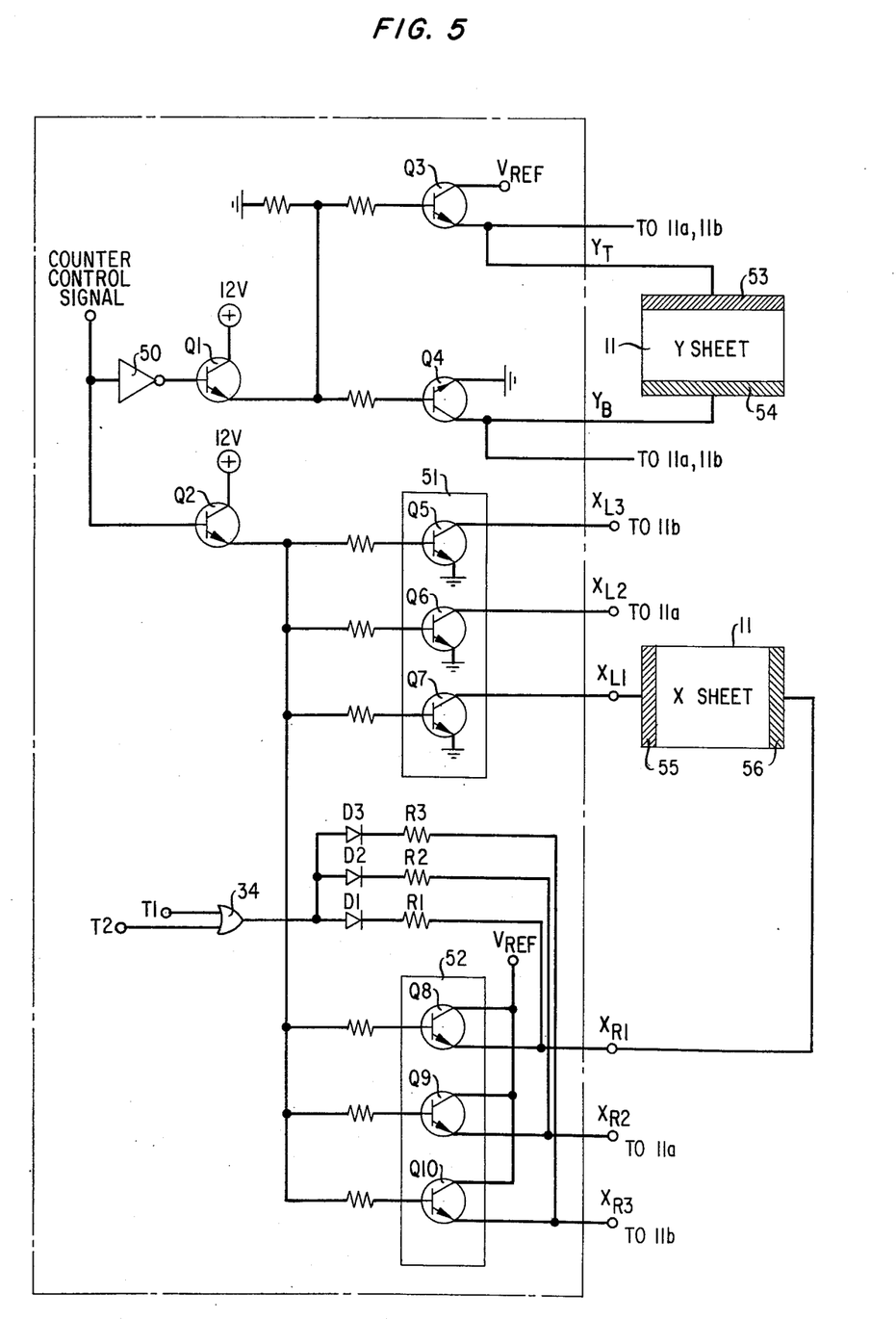
FIG. 5 illustrates in a schematic diagram the blackboard drive circuit in FIG. 3.

The blackboard drive 35 is shown in the block diagram in FIG. 5 and functions in the following fashion. When the counter control signal is low during time slots T1 through T4, transistor Q1 is turned on via inverter amplifier 50; Q1, in turn, turns on transistors Q3 and Q4.

With transistors Q3 and Q4 turned on, a voltage gradient is applied across the Y sheet of blackboard 11, which is referred to as the Y-drive. The collector electrode of Q3 is advantageously connected to predetermined reference voltage, $V_{REF}$, which in this embodiment is +5 volts, hence applying +5 volts to terminal 53 on the top side of the Y sheet of blackboard 11 via lead $Y_T$; while the emitter electrode of transistor Q4 is grounded, hence grounding the terminal 54 on the bottom side of the Y sheet of blackboard 11 via lead $Y_B$ during time slots T1 through T4. The other two blackboards 11a and 11b are also driven by transistors Q3 and Q4 via the same leads $Y_T$ and $Y_B$ in an identical manner.

At the same time, the polarity of the counter control signal turns off transistor Q2, which turns off the transistor arrays 51, 52 that are connected in a similar fashion to the X sheets of the blackboards, except that each blackboard 11, 11a, 11b, is driven by its own pair of transistors, via leads $X_{R1}$ and $X_{L1}$, $X_{R2}$ and $X_{L2}$, and $X_{R3}$ and $X_{L3}$, respectively, to be explained later.

In time slots T5 through T8 however, the preceding conditions are exactly reversed; the counter control signal goes high to turn off transistor Q1 and turn on transistor Q2. In this condition transistors Q3 and Q4 are turned off and the transistors of arrays 51, 52 are turned on; now the X sheet of each blackboard 11, 11a, 11b, has a +5 volt gradient thereacross, this condition being referred to as the X-drive.

In time slots T1 and T2 of the Y-drive, the X sheet of each blackboard is driven to a large value, say, +12 volts. This time interval is referred to as the Z drive during which the net voltage of each of the X sheets is sampled to determine whether writing has occurred on any of the blackboards. In the time slots T3 and T4 of the Y-drive, the X sheet of each blackboard is floating during which voltages representing the Y position of the chalk on the respective blackboards are sampled via leads $X_{R1}$, $X_{R2}$, and $X_{R3}$.

In time slots T5 through T8 of the X-drive, the Y sheets of the blackboards are floating. In the time slots T5 and T6, a voltage $V_{REF}$ representing the maximum value of the X and Y position voltages is sampled, the time interval hence being referred to as the REF drive. In the time slots T7 and T8, a voltage representing the X position of the chalk on the blackboards is sampled via common lead $Y_T$.

The four voltages representing the Z, Y, $V_{REF}$, and X signals are each sampled in the second time slots $T_2$, $T_4$, $T_6$, and $T_8$ of their allotted time intervals. This is to allow sufficient time for the establishment of steady state voltages between the X and Y sheets of the respective blackboards; a large capacitance existing between the sheets of each blackboard results in slow or gradual rather than instantaneous voltage changes.

Figure 4:
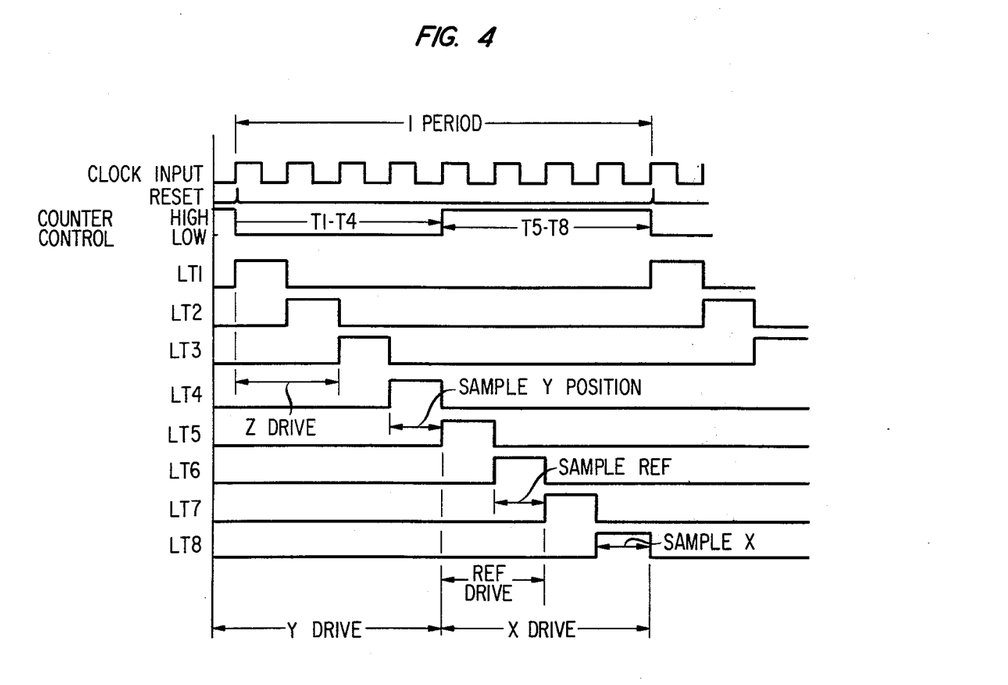
FIG. 4 is a time chart showing the generated time signals and the operations occurring in a predetermined time period.
Figure 6A:
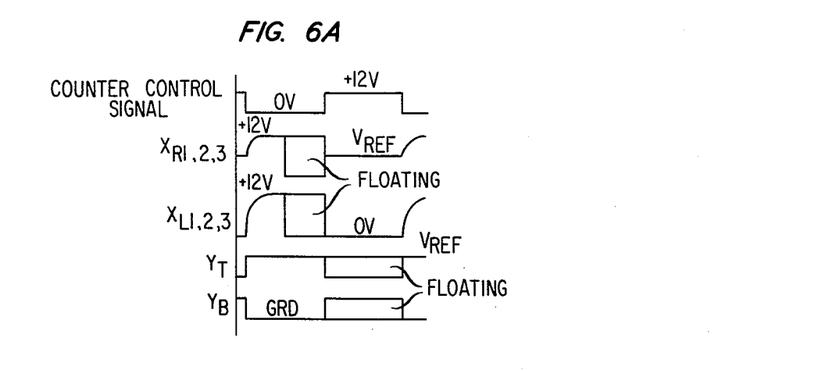
FIGS. 6A and 6B are time charts illustrating the voltage conditions of the X and Y sheets of the respective blackboards.
Figure 6B:
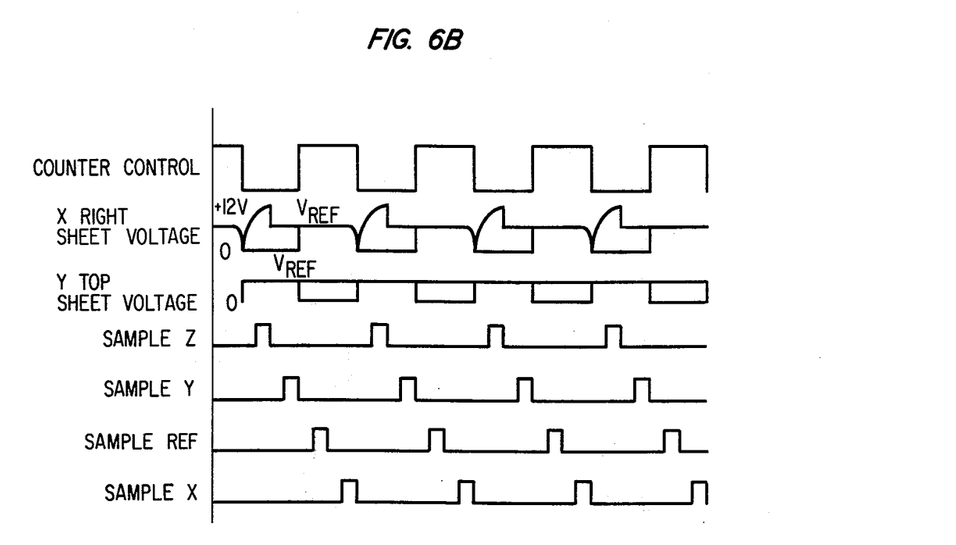

FIG. 4 illustrates the above-mentioned sampling sequence. FIGS. 6A and 6B illustrate schematically the conditions of the X and Y sheets during the sampling sequence as detected on the appropriate leads. FIG. 6A depicts how each of the sheets is driven in one period or cycle. FIG. 6B depicts the responding output voltage signals which can be detected from the sheets.

DETECTION OF WRITING

Figure 7:
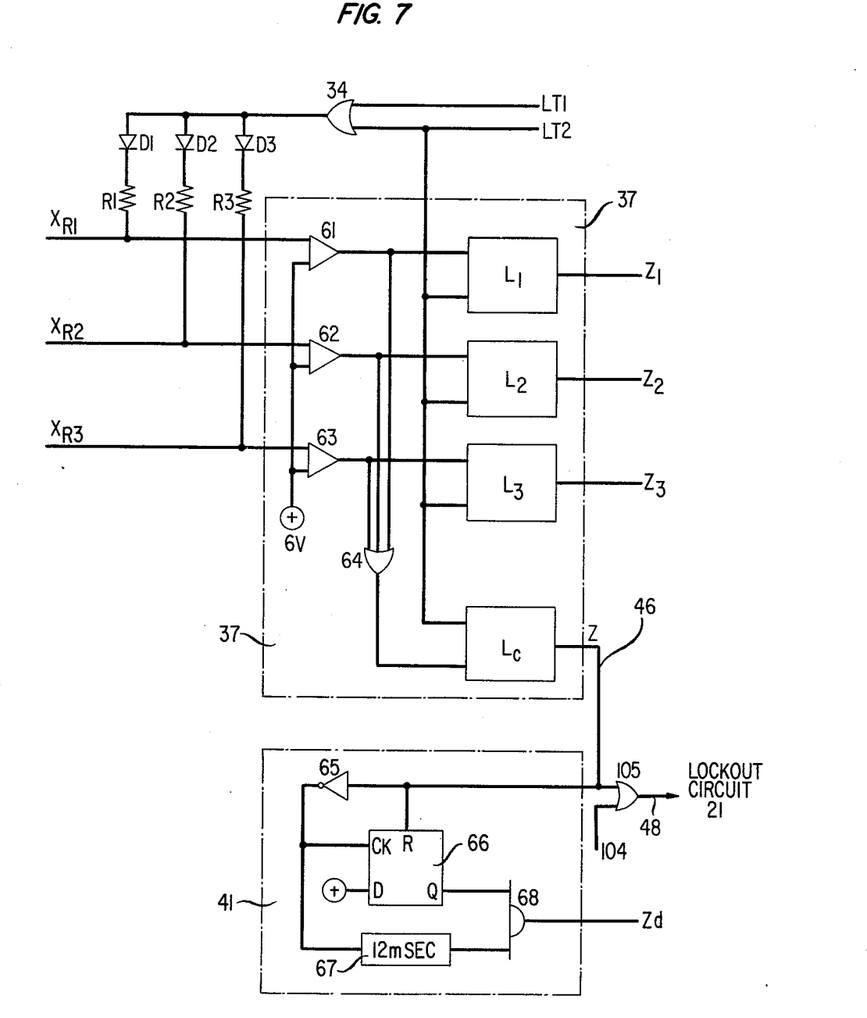
FIG. 7 illustrates in a schematic diagram the FIG. 3 writing detector circuitry and the Z delay circuit.

Detection of writing on a blackboard, say blackboard 11, is determined during the time slots T1 and T2 when a +5 voltage gradient is applied across the Y sheet and the X sheet is driven to a larger voltage of +12 volts via OR gate 34, which is activated by timing pulses T1 and T2. If writing or erasing is not occurring on the blackboard, no contact is made between the X and Y sheets, and the voltage on the X sheet will rise to +12 volts. If pressure is applied via an eraser or chalk, contact is made between the sheets; the voltage on the X sheet will then be forced to be between zero and +5 volts by the Y-sheet. Referring to FIGS. 5 and 7, OR gate 34 drives the X sheet of blackboard 11 via diode D1 and resistor R1, the resistance of R1 being substantially greater than the resistance of the X sheet. Hence, should a voltage differential occur as a result of contact between the X and Y sheets, most of the voltage drop will occur across R1 so that the X sheet will have a voltage approximately that of the Y sheet where contact is made. A comparator 61 in the writing detector 37 compares the voltage of the X sheet on terminal $X_{R1}$ to some reference voltage, say +6 volts. If the voltage of the X sheet is less than +6 volts, comparator 61 generates a high output signal to indicate that writing is occurring. The output of comparator 61 is strobed via OR gate 64 into a common latch $L_C$ by timing pulse $T_2$. The high comparator 61 output signal activates common latch, $L_C$ to generate a high output Z signal to indicate that either writing or erasing is occurring on blackboard 11.

The high Z signal transmits to the lockout circuit 21 to put transceiver 10 in a transmit mode via lead 46, OR gate 105 and lead 48. At the same time, the high Z signal is further processed to generate either a write or erase command $Z_{ec}$ for transmission.

Where the system includes three blackboards, writing on the additional blackboards 11a and 11b is detected in an identical manner.

As suggested in FIG. 4, the X and Y sheets for additional blackboards 11a, 11b (if provided) may readily be connected to respective leads $Y_T$, $Y_B$, $X_{L2}$, $X_{L3}$, $X_{R2}$, $X_{R3}$. The X sheets of blackboards 11a, 11b are driven by OR gate 34 via diode D2 and resistor R2, and via D3 and R3 respectively, along with the X sheet of blackboard 11; and the measured voltages of the X sheet of blackboards 11a and 11b are compared at comparators 62, and 63, respectively, to +6 volts. If any of the X sheets of the blackboards 11, 11a, or 11b generates a voltage less than +6 volts, the common latch $L_C$ is activated via OR gate 64 and the Z signal is generated as high or active. Thus, Z is generated active or high whenever any blackboard is being written on or erased with an eraser.

IDENTIFYING THE BLACKBOARD BEING USED

The just-described detection of writing arrangement is also advantageously used to determine which one of the plural blackboards is being written on, so that appropriate transmit commands can be generated to enable the corresponding TV monitors at the remote stations to be activated.

As shown in FIG. 7, the outputs of the comparators 61, 62, 63 are also strobed into additional latches $L_1$, $L_2$, $L_3$ by timing pulse T2. There is one latch for each of the three blackboards, as well as the common latch $L_c$ for all three blackboards, which detects any writing. The $Z_1$, $Z_2$, $Z_3$ outputs of the latches $L_1$, $L_2$, $L_3$ respectively are binary coded in encoder 40 into 2 bits, $b_1$, $b_2$, and sent via serializer 45 to the receiver 17 to select the proper display, hence identifying which blackboard is being used. In addition, these outputs are used to control selector 38 which connects the leads containing the voltage of the X sheet on the blackboard being written on to the input of the sample and hold circuit 43.

DETERMINATION OF CHALK POSITION

During the Y-drive, the X sheet is floating (T3 and T4). If pressure is made, say, with chalk, on the blackboard 11, the X and Y sheets will make physical contact at that point. The X sheet will then assume the voltage of the Y sheet at the point of contact. This voltage, of some value from 0 to +5 volts, represents the Y position of the chalk on the blackboard. Because a voltage gradient in applied across the Y sheet, i.e., +5 volts at the top terminal 53 and 0 volts at the bottom terminal 54, the ratio of the voltage measured with respect to +5 volts is proportional to the ratio of the distance between the bottom of Y sheet and the point of contact to the total height of the Y sheet. Hence, sampling the X sheet at time slot T4 will generate a voltage representing the chalk's Y position at that time since the other parameters are known.

Likewise, during the X-drive, when the Y sheet is floating, the Y sheet assumes the voltage of the X sheet at the point of contact. This voltage, also of some value from 0 to +5 volts, represents the X position of the chalk on the blackboard. Because a voltage gradient is applied across the X sheet, i.e., +5 volts on the right terminal 56 of the X sheet and 0 volts on the left terminal 55, the ratio of the voltage measured with respect to +5 volts is proportional to the ratio of the distance between the left side of the blackboard and point of contact to the total width of the X sheet. Hence, sampling the Y sheet during time slot T8 will generate a voltage representing the chalk's X position.

It was noted earlier that a reference voltage is sampled. During the X-drive, a voltage $V_{REF}$ of approximately +5 volts is applied to lead $X_{R1}$ and terminal 56. This voltage $V_{REF}$ on terminal 56 is sampled by sampler 36 during time slot T6 to yield the voltage representing the maximum X or Y position to reference the X and Y position voltage samples during further analog processing.

Further analog processing is achieved in the selector 38, sample and hold 43 and analog-to-digital converter 44 circuits of the transmitter 16 is depicted in FIG. 3.

The Y position and $V_{REF}$ voltage samples (sensed on the $X_R$ leads to the blackboards) from the blackboard currently being written on are selected by conventional analog switches in selector 38 under control of the writing detector circuit 37 to determine whether the voltages on the X sheet of blackboard 11, 11a, or 11b should be pulsed into sample and hold circuit 43. The X position voltage sampled (i.e., the common $Y_T$ lead to the blackboards) is sent directly to the sample and hold circuit 43 via lead Y.

The properly selected samples are then stored for subsequent A to D conversion in conventional sample and hold circuit 43. The sample and hold X and Y outputs are converted into digital form using a conventional dual-slope A–D converter 44. The reference output of the sample and hold circuit 43 is used as a reference for the A to D converter 44.

AVOIDING DISTORTION OF THE WRITING SIGNAL

Figure 8:
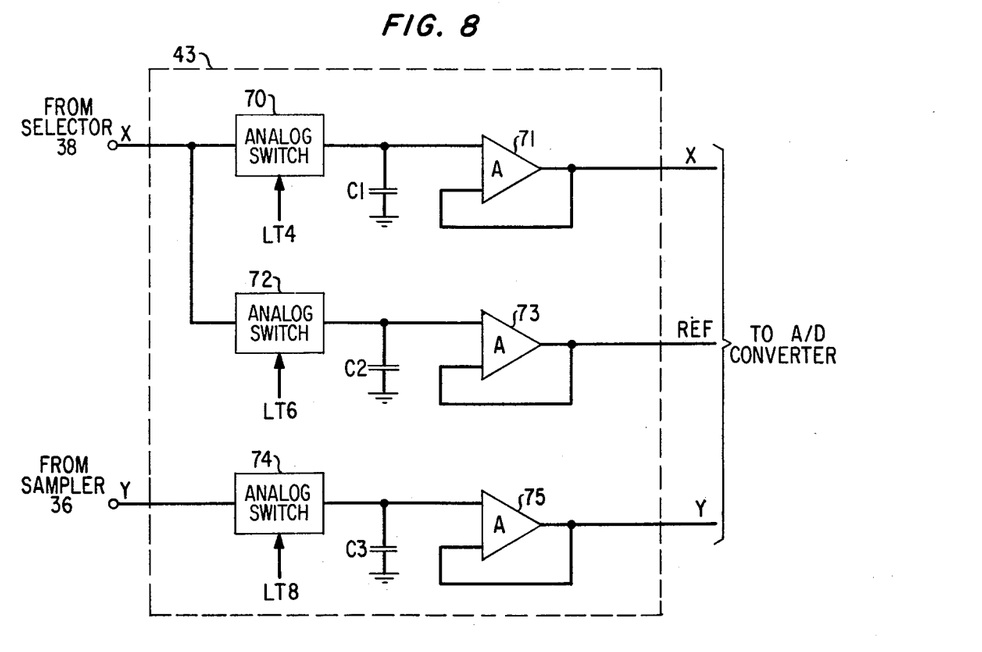
FIG. 8 illustrates in a schematic diagram the FIG. 3 sample and hold circuits.

In any two coordinate time sequential sampling system, there is necessarily a delay in the X and the Y readings. It has been empirically determined that high quality reconstruction of an original writing can be achieved by a sampling rate of forty samples per second of each of the X and Y coordinates. This is the rate consistent with the Nyquist criteria of sampling at a rate equal to at least twice the highest frequency. Since, however, the X and Y values are not sampled simultaneously in the present system, the delay between the X and Y samples would cause the spatial equivalent of phase distortion, a warping or skewing of the writing on the display 13. To minimize these delays, pursuant to a further feature of the invention, the blackboard 11 is sampled 250 times per second by the sampler 36. The output of this sampling is filtered by sample and hold circuit 43 and held in capacitors C1, C2, C3; and then the content of the sample and hold circuit is resampled at the 40 Hz sampling rate by A to D converter 44 for transmission. A simple block diagram circuit achieving the foregoing is shown in FIG. 8.

One portion of sample and hold circuit 43 comprises an analog switch 70 which is strobed by timing pulse T4 to sample the voltage across the X lead during time slot T4 and to store the voltage in capacitor C1, hence to identify the Y position of the blackboard being written on. The second analog switch 72 is also connected to X lead and is strobed by timing pulse T6 across the X lead to sample the voltage $V_{REF}$. This $V_{REF}$ voltage is stored in capacitor C2.

The other portion of sample and hold circuit 43 connects to the Y lead from sampler 36. During time slot $T_8$, the analog switch 74 is strobed to sample the voltage representing the X position which is then stored in capacitor C3. Internal resistance in each of the analog switches 70, 72, and 74 in conjunction with their corresponding capacitors C1, C2 and C3 respectively, operate as low-pass filters to smooth out the voltages being sampled.

As mentioned earlier, the X and Y values are sampled at a much higher rate by sampler 36 and sample and hold circuit 43 than by A to D converter 44. Advantageously, the A to D converter 44 is synchronized to the sampling rate of sampler 36 via the A to D timing signals generated by the binary divider 32 in the timing source 30 so that the voltages are not changing across the capacitors when the voltages of the capacitors are being sampled for A to D conversion. The voltages are sampled by the A to D converter 44 via the high input impedance unity gain amplifiers 71, 73, 75.

DELAYED TRANSMISSION

Pursuant to another aspect of this invention, the Z signal generated by writing detector 37 is processed by conventional delay circuit 41 to prevent intermittent contacts from causing the transmitter 16 to transmit spurious information to a remote receiver 17. The Z delay circuit 41, which comprises an inverter 65, a flip-flop 66 in parallel with a conventional delay circuit 67, and an AND gate 68, requires that the Z signal stay active or high for at least 12 milliseconds before writing is transmitted. Storage of all blackboard information takes place, but it is simply not transmitted until the writing signal Z is at least a predetermined length in time.

After the Z signal is active for at least 12 milliseconds, Z delay circuit 41 will generate an output signal $Z_d$ that is low to serializer 45, enabling serializer 45 to receive positional data for transmission. This $Z_d$ signal is also sent to NOR gate 42. The other input to NOR gate 42 is an inverted erase E signal from inverter 39; if inverter 39 output is high, erasing is occurring. NOR gate 42 generates output signal write/erase command $Z_{ec}$ which is then sent to serializer 45 for transmission. If $Z_{ec}$ is high, pressure on the blackboard is interpreted as a writing signal. If $Z_{ec}$ is low, pressure on the blackboard is interpreted as an erase signal.

The write/erase command $Z_{ec}$ is combined with the digital X and Y samples from A to D converter 44 and the blackboard selector bits in conventional shift register serializer 45 whose output is the transmitted data signal applied to the modem 18. Conventional synchronizing and control signals, are inserted into the data stream along with positional data to permit the receiver to properly interpret the data.

PARTIAL ERASE MODE

As mentioned earlier, pressure made on a blackboard can be interpreted as writing or erasing. For erasure of portions of writing at a blackboard, pressure presumably made by an eraser removed from its tray is advantageously transmitted with positional data to delete the corresponding information from the corresponding display.

Figure 11:
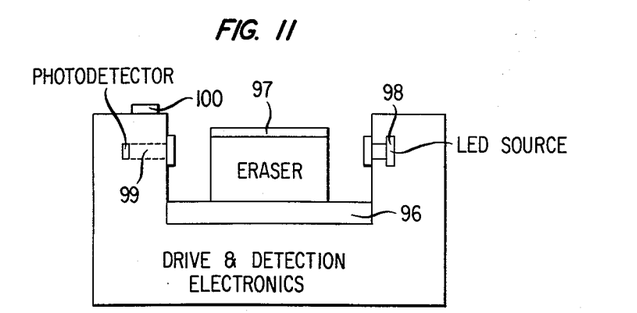
FIG. 11 is a front view of an eraser and tray which attaches to a blackboard input terminal in accordance with this invention.

The erase mode of transmitter 16, which uses a light detector, is advantageously immune to false triggering, even in the presence of high ambient illumination. Thus, as shown in FIG. 11 an eraser tray 96 is provided with an eraser 97. An LED light source 98 that advantageously is infrared in wavelength, is placed in line with a photodetector 99. Normally, eraser 97 blocks the passage of light. When eraser 97 is removed from the tray 96, a light path is established and photodetector 99 is turned on. A low output signal E is thus produced when the eraser is removed. The E signal is inverted via inverter 39 and applied to NOR gate 42 as seen in FIG. 3 to place the transmitter 16 in a transmit erase mode.

Figure 12A:
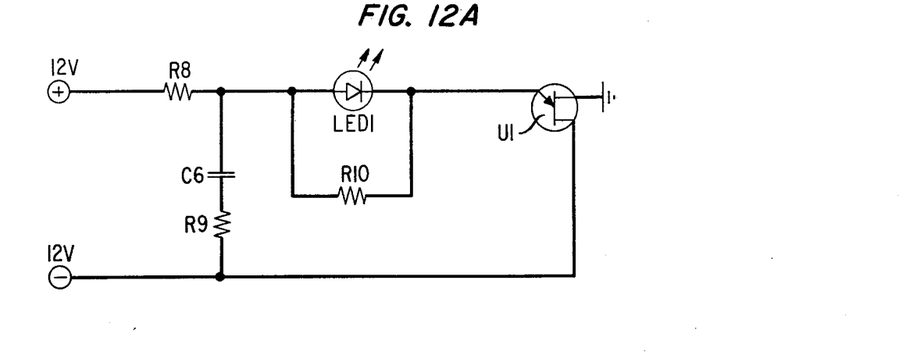
FIG. 12A depicts in a schematic diagram the light-driving circuitry in FIG. 11.

One form 98 of drive circuit for the photodetector function is shown in FIG. 12A. By virtue of the components, a resistor R8, a capacitor C6, and a unijunction transistor U1, which form a relaxation oscillator, this drive circuit 98 draws advantageously less than ten milliamperes average current but drives the light-emitting diode LED1 with current pulses whose peak amplitudes are one-half amperes. Unijunction transistor U1 does not turn on until capacitor C6 charges to a predetermined voltage. When U1 turns on, C6 discharges to drive LED1. In the particular circuit, the time between the LED1 current pulses is every 25 milliseconds. LED1 emits very narrow or spiked high-energy light pulses every 25 milliseconds. Resistor R9 provides some current limiting for the LED1. Resistor R10, in parallel with LED1, prevents random firing of the circuit in the presence of noise or voltage spikes by placing a "low" impedance in shunt with LED1.

Figure 12B:
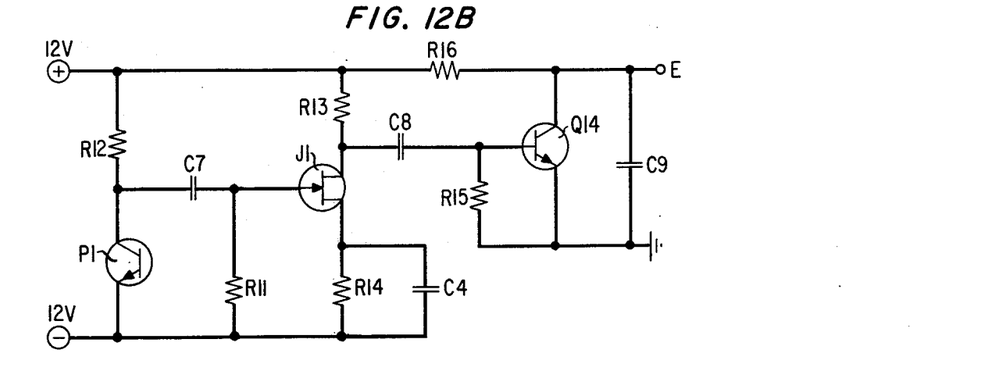
FIG. 12B depicts in a schematic diagram the photodetector circuitry in FIG. 11.

Pursuant to the invention, the light-detecting circuit 99, as schematically depicted in FIG. 12B, responds only to the high frequency component of a received light signal, i.e. normally the spiked light pulses of the light-emitting diode LED1. Slowly varying or steady background illumination, or even light changes, in a room containing the blackboard thus are not effective to trigger detector 99.

Silicon phototransistor P1 is biased with resistor R12 and AC coupled to junction field effect transistor J1 with resistor R11 and capacitor C7, which form a high pass filter so that only high frequency pulses pass to transistor J1. The output of transistor J1 is coupled to the base of transistor Q14, which is normally off in the absence of light pulses. A low erase signal E is generated by the collector of Q14 when Q14 is turned on, and sent to NOR gate 33 via inverter 39 to put the transmitter 16 into an erase mode transmission.

Figure 13:
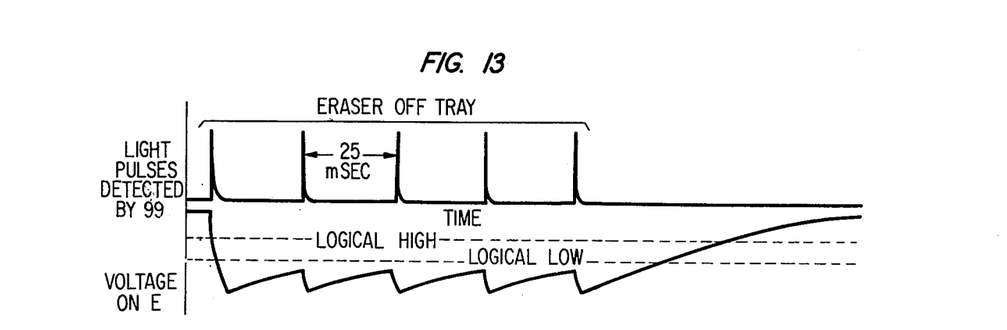
FIG. 13 is a diagram illustrating the pulse output of the FIG. 12A circuit and the measured response on lead E on the FIG. 12B circuit.

FIG. 13 shows the light pulses received at the detector 99 and the resulting E voltages on lead E when the eraser 97 is removed and replaced. The voltage on E lead starts climbing towards the logical high level whenever a pulse from LED1 is not received, but advantageously resistor R16 and capacitor C9 have a relatively slow time constant so that a high signal E cannot be reached within 25 milliseconds and a low E signal is sent to NOR gate 42.

TRANSMIT CLEAR MODE

When a blackboard 11 is being erased entirely of all graphics information, a clear switch 100 located on eraser tray 96, as shown in FIG. 11, is manually depressed to send a logical high or active clear signal via lead 101 to transmitter 16 putting the transmitter in a transmit clear mode to generate clear display signals for transmission. If three blackboards are connected to the system, corresponding clear switches 100a, 100b, are also located on the eraser trays of the blackboards 11a, 11b, and connected to transmitter 16 via leads 101a, 101b, respectively.

Shown in FIG. 3 are the three clear switch leads 101, 101a, 101b, connected to an OR gate 103 which generates a logical high or active clear signal CL if any high inputs are detected.

The clear switch leads 101, 101a, 101b, are also connected to encoder 40 where the signals on the leads 101, 101a, 101b, are binary coded into two display selector bits, $b_1$, $b_2$, to identify which display is to be cleared.

A high CL signal output of OR gate 103 feeds to serializer 45 via lead 104, to command serializer 45 to generate a clear command comprising conventional sync characters, the display selector bits from encoder 40, and a predetermined bit pattern indicating a clear signal, for transmission. In practice, eight such commands are transmitted, to be explained later.

Lead 104 also connects to lead 48 via OR gate 105. If either the CL or Z signal is active, the output on lead 48 is high to put transceiver 10 in a transmit mode.

HALF-DUPLEX SYSTEM OPERATION

Pursuant to a further feature of the invention the system such as depicted in FIG. 2 is normally maintained in a receive mode. For example, when chalk touches one of the blackboards, the lockout circuit 21 is called into play and prevents writing from being received from a distant terminal or station as long as writing continues locally. Also, lockout circuits at the distant stations prevent their associated transceivers from transmitting as long as writing is received simultaneously by commanding the remote transceivers to stay in their receive mode.

Referring to FIG. 2, the lockout circuit 21 is a conventional transfer switch which is controlled by the state of the transmitter 16 and receiver 17 via leads 48 and 93, respectively.

If the Z or CL signal is active or high (writing or erasing is occurring on some blackboard) on lead 46, 104, respectively, at the local transmitter before a distant transmitter starts to transmit, the transmit data and the transmit modulator on paths for the transmitter 16 via leads 47, 48, are established through the lockout circuit 21 to the modulator 18a of the modem 18 via leads 77, 78, respectively. The output lead 48 from transmitter 16 connects via the lockout circuit 21 to the output lead 78 so as to turn on the modulator 18a. In addition, a transmit/receive switch denoted 22 is operated by a high or active output on lead 76 from lockout circuit 21 to open the normally closed contact 22b and to close the normally open contact 22a, hence connecting the transmit data path from modulator 18a to telephone line 14 via lead 27 and line interface 19. At the same time, the received data path 92 from receiver 17 through the lockout circuit 21 is blocked as is the receive data path to lead 28 from switch 22 leading to the demodulator 18b of modem 18.

If a properly formatted signal is received by the receiver 17 from the telephone line 14 via demodulator 18b before writing occurs on the local blackboard(s), the path from the receiver 17 is already established via leads 93, 92 to the lockout circuit 21 to turn on the modulator 18a via lead 78 and to transmit data to modulator 18a via lead 77. However, lead 93 transmits a high signal output from receiver 17 when data is being received to block transmit leads 48 and 47, hence commanding the transceiver 10 to stay in its receive mode. The modulator output on lead 26 is prevented from reaching the telephone line by the transmit/receive switch 22 which is now in the off or receive position disconnecting the modulator 18a with lead 27 of interface 19, while the transceiver 10 is receiving data from telephone line 14.

Thus, if a number of these units are interconnected, the first unit to start transmitting will prevent all others from transmitting until its transmission ceases. The lockout circuit 21 functions in the following manner. When writing or clearing occurs, a high Z signal generated by writing detector 37 or CL clear signal in the transmitter 16 connects the transmitter leads to modulator 18a and connects the modulator output to the telephone line 14 via the transmit/receive switch 22. In addition, Z or CL being active, disables the paths 93, 92, from the receiver 17 which carry the receive modulator on and received data signals respectively.

It is noted that the modulator output on lead 26 is available for recording via lead 29 and tape interface 20 whether transceiver 10 is in the transmit or receive mode.

RECEIVE MODE

When the transmitter 16 of, say, the local transceiver 10 is not transmitting, transceiver 10 is maintained in a receive mode whether data is being received from the telephone line 14 or not. Receiver 17 constantly monitors the input from demodulator 18b for data.

Figure 9:
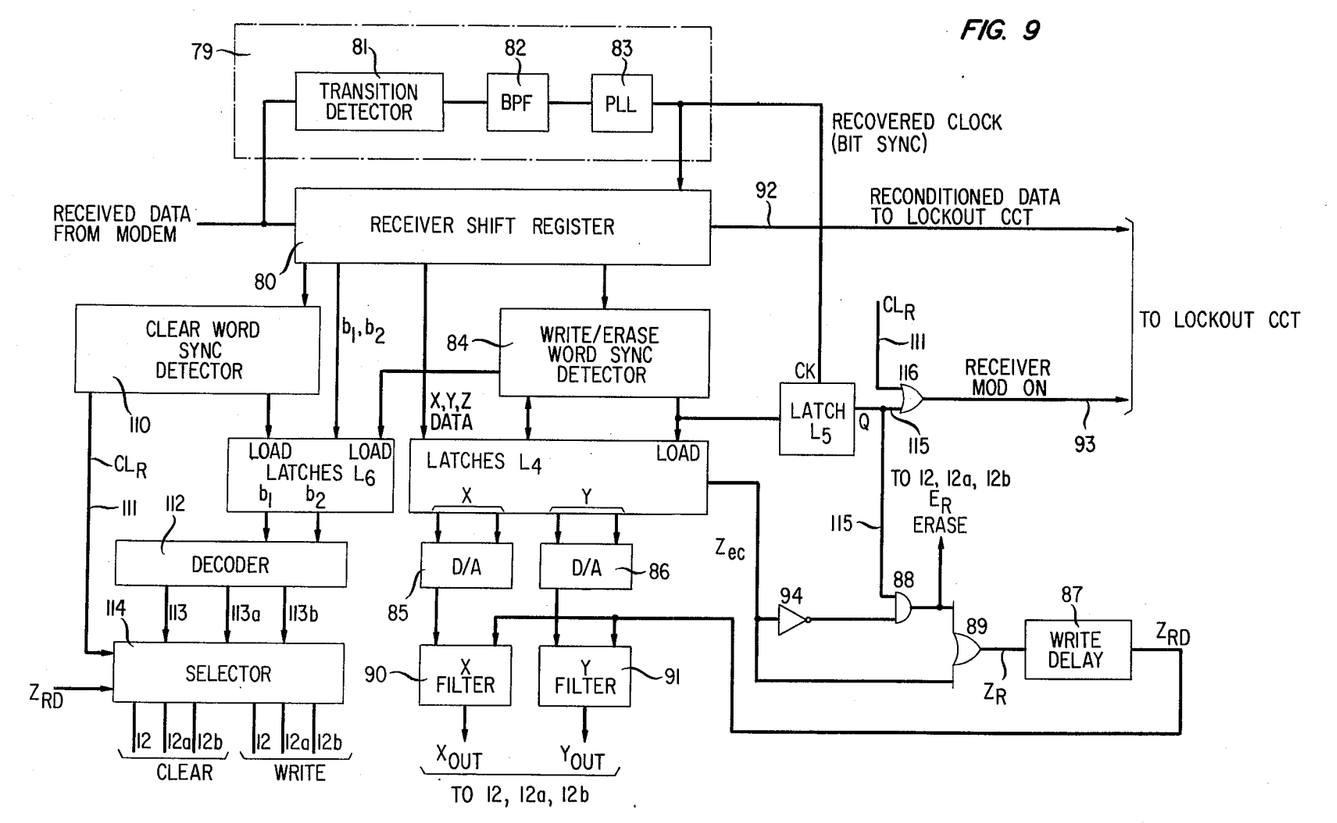
FIG. 9 depicts in a block diagram the FIG. 2 receiver.

Referring to FIG. 9, receiver 17, upon receiving data from the modem 18, clocks the data through the receiver shift register 80 with a recovered clocking scheme 79. A conventional word sync detector 84 then examines the input data from the register for presence of sync characters which indicate whether writing or erase signals have been received, while a clear word detector 110 examines the input data for presence of clear words.

The clear word detector 110, in practice, looks for at least four clear commands before generating a high clear signal $CL_R$ on lead 111. Lead 111 connects to lead 93 of lockout circuit 21 via OR gate 116 and to a selector 114. Assuming that clear sequence words are detected, clear word detector 110 sends a load command to latches L6 to receive the two display selector bits, $b_1$ and $b_2$. The bits, $b_1$, $b_2$, are then decoded in decoder 112 to generate a high output on lead 113, 113a, and 113b, for the display being called into play. The decoder 112 outputs are then fed through selector 114 under the control of the clear command $CL_R$ on lead 111 and delayed write command $Z_{RD}$, to be explained later, to determine whether the appropriate memory is to be ordered to write (or erase) or clear. If clear signal $CL_R$ is active, a clear command is sent to the appropriate memory via the corresponding clear lead.

Assuming that a distant transmitter is sending, writing or erasing data, then the sync characters will cause a high output from word sync detector 84, which in turn signals to latches L4 to load the X, Y, Z data, and latches L6 to load the display selector bits, $b_1$, $b_2$, and at the same time activates latch L5 to generate a high output on lead 115 and in turn on lead 93 via OR gate 116. A high or active signal on lead 93 turns the receiver modulator 18a on in transceiver 10 via lockout circuit 21 as earlier described. The output on lead 115 is also connected to AND gate 89 to regenerate an erase signal $E_R$ for erasing as well as a write command signal $Z_R$ for showing that pressure is being made on a blackboard, be it by chalk or eraser.

To generate signal $E_R$, the received signal $Z_{ec}$ is inverted by inverting amplifier 94 and sent through AND gate 88. If $Z_{ec}$ is low so that inverted $Z_{ec}$ is high, and data is being strobed into latches L4, a high or active signal output 1 is generated by AND gate 88, indicating an erase mode $E_R$. If $Z_{ec}$ is zero so that inverted $Z_{ec}$ is one, and no data is being strobed into latches L4; the AND gate 88 output signal is then low and no erasing is occurring.

The output of AND gate 88 and signal $Z_{ec}$ from latches L4 are fed to OR gate 89. If either $Z_{ec}$ or $E_R$ is high, this will generate a high write command signal $Z_R$ indicating that pressure, either by chalk or eraser, is being made on a remote blackboard.

AVOIDING DISTORTION AT RECEIVER

Figure 10:
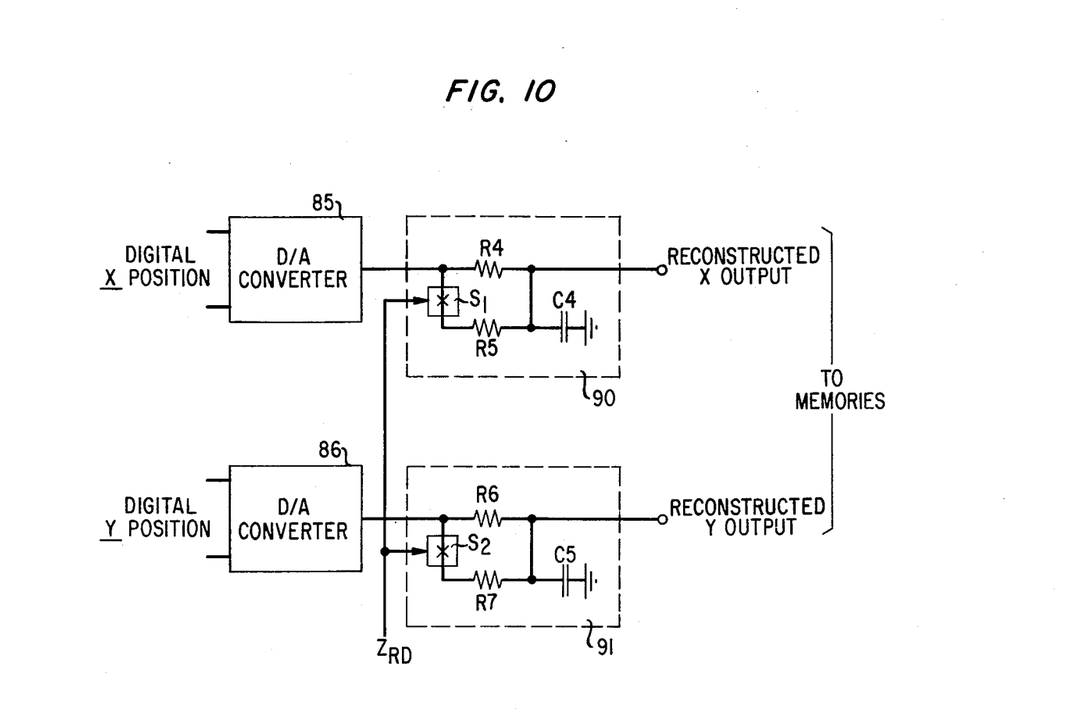
FIG. 10 illustrates in a schematic diagram the FIG. 9 dual mode reconstruction filters in greater detail.

Pursuant to another aspect of this invention, the write command $Z_R$ is delayed at the receiver 17 to avoid distortion of the writing on the displays 13 in the following way. The received X and Y data is each converted into an analog form by corresponding D to A converters 85, 86, and then applied to corresponding dual mode reconstruction filters 90, 91, as shown in FIG. 10.

The two dual mode filters 90, 91 each comprises two parallel resistors R4, R5 and R6, R7 respectively that are connected to capacitors C4 and C5 respectively. The resistors R4 and R6 (20 kilohms) are substantially larger than the resistors R5 and R7 (200 ohms). The filters 90, 91 are connected via switches $S_1$ and $S_2$, respectively, to the delayed write command $Z_{RD}$ signal which causes the filters to operate in either a fast or slow mode.

When the delayed write command $Z_{RD}$ is turned off or low, the filters 91, 92 are activated in the fast mode. The switches $S_1$, $S_2$ of the filters 91, 92, along with resistors R5 and R7 short the larger resistors, i.e., resistors R4 and R6, respectively, to produce a filter having a relatively rapid rise time. When the write command $Z_R$ signal is turned on or high, this opens the switches $S_1$, $S_2$ of the filters 90, 91 so that the filters operate in the slow mode, resulting with a relatively slow rise time.

When write command $Z_R$ is generated in the receiver 17 from transmitter signal $Z_{ec}$, it is delayed by approximately twelve milliseconds via conventional write delay circuit 87. During this time the filters 90, 91 will quickly generate the initial X and Y voltages to establish the initial conditions before the delayed write command $Z_{RD}$ is given. After the delay time, the filters 90, 91 are switched to their slow mode. During this time they provide a continuous output between the received samples. Advantageously, write command $Z_R$ turn off is also delayed by delay circuit 87 to make allowance for the inherent delay in reconstruction filters. Without this delay, completion of reconstruction would occur after the write command $Z_R$ turns off and would cause the last portion of writing or erasing to be missing. Lockout circuit 22 of FIG. 2 is deemed to include a delay circuit for delaying the termination of transmission to permit full transmission of positional data to occur in like manner as would be apparent to one skilled in the art.

The above filters described in the receiver 17 in their fast mode have a rise time of approximately one-half millisecond. In the slow mode the rise time is approximately fifty milliseconds.

TAPE RECORDING SIGNAL ENHANCEMENT

Figure 14:
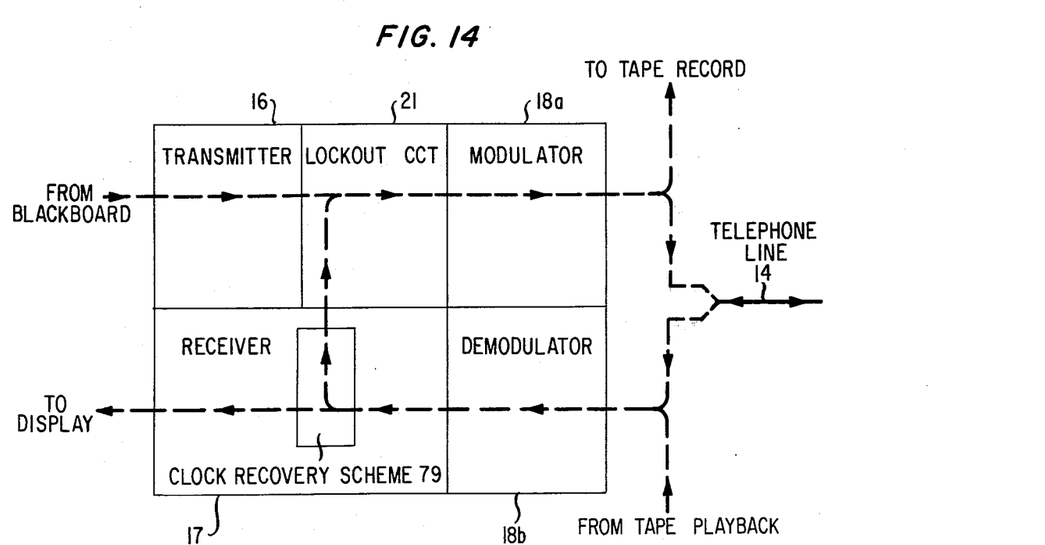
FIG. 14 is a flow diagram of the tape recording signal enhancement aspect of the inventive transceiver system.

Pursuant to a further feature of the invention, the graphics transmission is recorded on a conventional audio tape recorder 95 shown in block diagram form in FIG. 14. If a two track or stereo recorder is used, the voice and graphics can be recorded simultaneously, providing synchronous playback.

Because of transmission impairments, such as jitter, are introduced by telephone lines, it is disadvantageous to record directly from the telephone line. Therefore, pursuant to a further feature of this invention as depicted in FIG. 9, the incoming signal to transceiver 10 is demodulated and any jitter present is reduced by a conventional clock recovery scheme 79 in the receiver 17 and then remodulated before the recording.

The incoming signal to transceiver 10 is demodulated and bit sync is recovered by a conventional clock recovery scheme 79 consisting of a transition detector 81, band pass filter 82 and a narrow band phase locked loop 83 in the receiver 17. The narrow band loop 83 reduces the input jitter by averaging the jitter over a period equal to the time constant of the loop. The bit sync clock shifts the demodulated signal through conventional shift register 80. The output data of the register 80 contains less jitter than the input since it is clocked through the register by the bit sync clock scheme 79 which has reduced jitter. The output of the shift register 80 drives the modulator 18a whose output is transmitted via leads 26 and 29 to the tape recorder and recorded, as shown in FIG. 2.

Inherent in any tape recorder is also the tendency to introduce jitters during the recording. Thus, pursuant to a further facet of the invention, during playback the jitter and other impairments introduced by the tape recorder are similarly removed by the same clock recovery scheme prior to retransmitting the data over the telephone lines or to a local display.

Advantageously, the playback signal from the tape recorder is buffered by a unity gain amplifier 24 and drives the demodulator 18b via a selector play switch denoted 23. When the switch 23 is in its normal off mode with contact 23b closed and contact 23a open, a received signal from the telephone line 14 is fed to the demodulator input. When the switch is in the play position with contact 23a closed and 23b open, the tape signal is fed to the demodulator 18a. The tape signal is then treated as if it were a received data signal from the telephone line; that is, it is demodulated and conventional bit, sync and word pulses are extracted from it. The data is then shifted through the shift register 80 shown in FIG. 9 and sent via lead 92 retransmission, as well as for further processing in receiver 17 for local displaying. This shifting process reconditions the timing of the information obtained in the tape signal.

Advantageously, to access the regenerated tape data for retransmission over the telephone lines 14, an auxiliary manual control switch 25 in transceiver 10, as shown in FIG. 2, is operated to connect the receiver output lead 93 to lockout circuit output lead 76, when playswitch 23 is operated in the play position. Hence, if tape data is being received at receiver 17, output lead 93 has a high output which in turn sends a high output to lead 76 to put transmit/receive switch 22 in the transmit mode to connect the modulator output on lead 26 to the telephone lines via lead 27 and line interface 19.

The spirit of the invention is embraced in the scope of the claims to follow.

What is claimed is:

1. A graphics originating station for transmitting graphics information to one or more remote stations, said originating station comprising:
   one or more graphics input terminals each including a contact-sensitive writing surface means for converting writing or the like to electrical X-Y indicia of coordinate points;
   means for transmitting said electrical indicia to said remote stations; and
   means for delaying the sending of any electrical indicia derived from contact with any one of said writing surfaces to said remote stations until said contact is at least a predetermined length in time.

2. The originating station of claim 1 further comprising:
   first means for sampling the X and Y values of said electrical indicia at a rate substantially in excess of 40 Hz;
   means for filtering said sampled indicia;
   second means for sampling the resulting filtered signals at a rate of about 40 Hz; and
   means for transmitting said filtered samples.

3. The originating station of claim 2 wherein said writing surface comprises two closely spaced resistive sheets corresponding in width to X and Y coordinate axes and wherein said first sampling means includes a detector sequencer generating eight equal-length time slots; means operative in the first four said slots for applying a voltage gradient across the Y sheet; means operative in the fourth said slot for measuring the voltage on said X sheet while keeping said X sheet electrically floating; means operative in the fifth through eighth said slots for applying a voltage gradient across the X sheet; and
   means operative in the eighth said slot for measuring the voltage on said Y sheet while keeping said Y sheet electrically floating.

4. The originating station of claim 3 wherein said detector sequencer further comprises means for applying to said X sheet during the first and second time slots a separate relatively high voltage;
   means for measuring the net voltage on said X sheet; and
   means for utilizing the measured voltage.

5. The originating station of claim 4, wherein said detector sequencer further includes means for generating a reference voltage; and
   means for comparing the value of the first sample taken during the writing detection time and means for utilizing said comparison.

6. The originating station of claim 1, further comprising an eraser tray and eraser, a source of optical pulses and an optical pulse detector mutually positioned with said eraser normally thereinbetween when on said tray; and means responsive to an output from said detector for conditioning said input terminal to convert contacts with said writing surface into erase commands.

7. The originating station of claim 6 wherein said source and said detector operate in the infrared range.

8. The originating station of claim 5 further including a clear switch and means responsive to operation of said switch for clearing a remote display.

9. The originating station of claim 4 wherein said utilization means comprises means for interpreting said voltage as an indication that writing is taking place in said surface.

10. The originating station of claim 4, wherein said utilization means comprises means for interpreting said voltage as an indication as to which of said one or more input terminals is being written on.

11. The originating station of claim 5 further comprising an eraser tray and eraser, means for detecting the presence or absence of said eraser from said tray and means responsive to said detection for conditioning said input terminal to convert contacts with said writing surface into erase commands.

12. The originating station of claim 6 where said source of optical pulses comprises:
    a light-emitting diode; and
    a relaxation-oscillating circuit for drawing a low average current and driving said light-emitting diode with high current pulses.

13. The originating station of claim 12 where said light-emitting diode generates a high-powered light pulse of a relatively high frequency compared to room light changes.

14. The originating station of claim 13 where said optical pulse detector comprises:
    a high-pass filter for responding to said high-powered light pulses.

15. The originating station of claim 1 further comprising:
    a transceiver comprising said transmitting means and means for receiving electrical indicia from any of said remote stations;
    means for maintaining said transceiver in a receive mode;
    means responsive to contact with any one of said writing surfaces for switching said transceiver to its transmit mode unless electrical indicia is being received from a remote station, whereby said switching means locks said transceiver in said receive mode until transmission from said remote station has ceased; and
    one or more displays for receiving indicia and displaying writing or the like derived from said received indicia.

16. The originating station of claim 15 further comprising:
    means for delaying writing of said received indicia on said display.

17. The originating station 16 further comprising:
    means for establishing initially received X-Y indicia information in the receiving means before writing on said display begins.

18. The originating station of claim 17 further comprising:
    means for generating a continuous graphics output between samples of X-Y indicia on said display when writing is occurring.

19. A graphics originating station for transmitting graphics information to one or more remote stations over telephone lines comprising:

one or more graphics input terminals each including a contact-sensitive writing surface means for converting writing or the like to electrical X-Y indicia of coordinate points;
one or more displays for receiving indicia and displaying writing or the like derived from indicia;
a transceiver; means for maintaining said transceiver in a receive mode;
means responsive to contact with any one of said associated writing surfaces for switching said transceiver to its send mode unless electrical indicia is being received from a remote originating station, whereby said switching means locks said transceiver in said receive mode until transmission from said remote station has ceased;
means for delaying the sending of any indicia derived from said contact to said remote stations until said contact is at least a predetermined length in time;
means for recording graphics information received over said telephone lines; and
means for reconditioning said graphics information received over said telephone lines before said information is recorded.

20. The originating station of claim 19 where said reconditioning means further comprises:
means for remodulating said graphics information; and
means for retiming said graphics information.

21. The originating station of claim 19 further comprising:
means for generating graphics information that has been recorded; and
means for reconditioning said recorded gaphics information before transmission to an appropriate memory and display.

22. The originating station of claim 19 further comprising:
means for generating graphics information that has been recorded; and
means for reconditioning said recorded graphics information before transmission to a remote station.

23. A graphics transmission system of connected stations for transmitting graphics information from one or more originating stations to one or more remote stations and for visually reproducing said information at each of said remote stations, where each originating station comprises:
one or more graphics input terminals each including a contact-sensitive writing surface means for converting writing or the like to electrical X-Y indicia of coordinate points;
one or more displays for receiving indicia and displaying writing or the like derived from indicia;
a transceiver:
means for maintaining said associated transceiver in a receive mode;
means responsive to contact with any one of said associated writing surfaces for switching said associated transceiver to its send mode unless electrical indicia is being received from a remote originating station, whereby said switching means locks said associated transceiver in said receive mode until transmission from said remote station has ceased; and
means for delaying the sending of any electrical indicia derived from said contact to said remote stations until said contact is at least a predetermined length in time.

24. A graphics originating station for transmitting graphics information to one or more remote stations comprising:
a graphics input terminal including a contact-sensitive writing surface means for converting writing or the like to electrical X-Y indicia of coordinate points;
means for transmitting said electrical indicia to said remote stations;
an eraser;
an eraser tray;
means for detecting the presence or absence of said eraser from said tray to produce a predetermined output when said eraser is absent;
means responsive to said output from said detecting means for conditioning said input terminal to convert contacts with said writing surface into erase commands.

25. The graphics originating station of claim 24 where said detecting means comprises:
a source of optical pulses; and
an optical pulse detector, where said detector and said source are mutually positioned with said eraser normally thereinbetween when on said tray.

26. The graphics originating station of claim 25 where said source of optical pulses comprises;
a light-emitting diode; and
a relaxation-oscillating circuit for drawing a low average current and driving said light-emitting diode with high current pulses.

27. The graphics originating station of claim 26 where said light-emitting diode generates a high-powered light pulse of a relatively high frequency compared to room light changes.

28. The graphics originating station of claim 27 where said optical pulse detector comprises;
a high-pass filter for responding to said high-powered light pulses.

* * * * *